Patented Jan. 28, 1947

2,414,963

UNITED STATES PATENT OFFICE 2,414,963

PROCESS OF REMOVING SULPHUR FROM MINERAL OIL

Elliott B. McConnell, Shaker Heights, Ohio, assignor to The Standard Oil Company, Cleveland, Ohio, a corporation of Ohio No Drawing. Application March 10, 1944, Serial No. 525,951

9 Claims. (Cl. 196—24)

Crude petroleum is prone to contain sulphur compounds. In some cases these occur in very large amount. In conventional refinery practice, a particular disadvantage has arisen from the resultant wide spread corrosion which is distributed throughout the equipment in which the oil is processed. If in primary distillation, the temperature is merely such as to provide vaporization in the initial fractionating separation, sulphur compounds are largely undecomposed, and go on through to make additional trouble in the further processing operations. If on the other hand, the oil be heated to temperatures above 500° F., the naturally occurring sulphur compounds are decomposed, and certain sulphur compounds can be formed which are particularly refractory and difficult to ultimately successfully deal with. In accordance with the present invention, crude oils which contain sulphur may be processed with effective elimination of sulphur however, and avoidance of damage to equipment in the later stages of refining operations. Other objects and advantages will be apparent from the following description.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The crude oil to be processed, is, in accordance with the invention, subjected to heat-digestion or operation of temperature in a range above that necessary for distillation vaporization but below the temperature of substantial cracking, vaporization being prevented, and pressure being maintained in cases where necessary. And for example, when hydrogen sulphide is to be subsequently removed by fractionation, pressure may be sufficient to permit carrying out such fractionation. Thus, heating in the range of 500 to 800° F. converts complex sulphur compounds to hydrogen sulphide, and without substantial cracking action on the oil. The heat-digestion may be carried on batch-wise or in continuous manner, as preferred; and with particular convenience may be applied as the oil passes through a heating coil where it receives the necessary temperature treatment and time, and may thence be discharged to a fractionating column. At the temperature thus elevated above that necessary for distillation yet below substantial cracking, selective action on the sulphur compounds proceeds fairly promptly. By heat exchangers or other suitable temperature-reducing means following the heat-digestion, the temperature of the oil is lowered to satisfactory operating condition for a fractionating column, and here the hydrogen sulphide is fractionated out. If desired, the methane, ethane and propane can also be separated out at this stage, and the crude be stabilized. The oil may then be fractionated through into naphtha, kerosene, gas oil, and then with a second stage of heating to paraffin distillate, heavy gas oil etc., and residuum, as desired.

In some cases, instead of taking the sulphur off by fractionating out hydrogen sulphide, I incorporate a base or neutralizing agent, such as lime, soda ash, or the like, with the oil passing to the heater or after leaving the heater, to react with the hydrogen sulphide and other acidic compounds. The oil may then be filtered or be cooled for instance to about 200° F. or below the boiling point of water and be water washed and settled by suitable means to remove the reaction products, and this has the advantage of also removing other inorganic materials which may be present. If desired, a filter-aid may be added to assist in the filtering operation. The filtering may be carried out on the hot oil as it leaves the furnace, or if preferred a heat-exchanger or cooler may be interposed to lower the temperature of the oil before filtering. After separation of the sulphur compounds, the oil may be subjected to fractional distillation to such extent as may be desired.

Whether the hydrogen sulphide be eliminated by fractionating or by a neutralizing agent, as afore-described, in either case it is noticed that there is a heat-digestion or heat treatment of the oil at a temperature above 500° F. but below cracking range for the hydrocarbons, and the selective reaction of decomposition of sulphur compounds is effected without going into a time-temperature range causing inter-reaction with nascently cracked hydrocarbon groups. By these means the corrosive action of the sulphur is especially confined to the first unit or desulphurization equipment, which can be constructed of corrosion-resistant materials, thus reducing to a minimum the use of corrosion preventive measures in all the subsequent refining steps.

Other modes of applying the principle of the invention may be employed, change being made as regards the details described, provided the features stated in any of the following claims, or the equivalent of such, be employed.

I therefore particularly point out and distinctly claim as my invention:

1. A process of removing sulphur from mineral oil, which comprises heat-digesting the crude oil in the presence of a solid base forming sulphides with acid sulphur compounds, at a temperature at least 500° F. but below substantial cracking, while preventing substantial vaporization, cooling the oil to around 200° F., mixing water therewith, separating off the water and sulphide matter formed, and subjecting the oil to fractional distillation into lighter and heavier fractions.

2. A process of removing sulphur from mineral oil, which comprises heat-digesting the crude oil in the presence of a solid base forming sulphides with acid sulphur compounds, at a temperature above 500° F. but below substantial cracking, while preventing substantial vaporization, and then separating resulting insoluble sulphide matter.

3. A process of removing sulphur from mineral oil, which comprises heat-digesting the crude oil in the presence of a solid base forming sulphides with acid sulphur compounds, at a temperature above 500° F. but below substantial cracking, removing insoluble sulphide matter, cooling, and subjecting the oil to fractional distillation into lighter and heavier fractions.

4. A process of removing sulphur from mineral oil, which comprises heat-digesting the crude oil in the presence of a solid base forming sulphides with acid sulphur compounds, at a temperature above 500° F. but below substantial cracking, and separating resulting insoluble sulphide matter.

5. A process of removing sulphur from mineral oil, which comprises selectively breaking down sulphur compounds by heat-digesting the crude oil at a temperature above 500° F. but below substantial cracking action on the oil, lowering the temperature of the oil, fractionally distilling off hydrogen sulphide, and subjecting the oil to fractional distillation into lighter and heavier fractions.

6. A process of removing sulphur from mineral oil, which comprises selectively breaking down sulphur compounds by heat-digesting the crude oil at a temperature above 500° F. but below substantial cracking action on the oil, removing hydrogen sulphide, fractionating off methane, ethane and propane, and subjecting the oil to fractional distillation into normally liquid lighter and heavier fractions.

7. The process of removing sulphur from mineral oil, which comprises selectively heat-cracking sulphur compounds in the crude oil at a temperature just below oil-cracking temperature, then lowering the temperature of the oil, distilling off hydrogen sulphide, and subsequently fractionating the oil.

8. The process of removing sulphur from mineral oil, which comprises selectively heat-cracking sulphur compounds in the crude oil at a temperature just below oil-cracking temperature, then lowering the temperature of the oil, removing sulphur compounds, and subsequently fractionating the oil.

9. In the fractional distillation of mineral oil, selectively breaking down sulphur compounds by heat-digesting the crude oil at a temperature above 500° F. but substantially preventing cracking action on the oil, and then lowering the temperature of the oil and removing decomposed sulphur compounds formed, before fractionating the oil.

ELLIOTT B. McCONNELL.